(12) United States Patent
Simen et al.

(10) Patent No.: US 8,995,260 B2
(45) Date of Patent: Mar. 31, 2015

(54) METHOD AND APPARATUS FOR MANAGING LOAD IN A COMMUNICATION NETWORK

(75) Inventors: Silviu Florian Simen, Mississauga (CA); Barry Steven Ford, Waterloo (CA); Jason William Tackaberry, Waterloo (CA); Samuel David Glazer, New York, NY (US); Areg Poghosyan, Kitchener (CA); James Robert Millar, Toronto (CA); Yusof Ganji, Milton (CA); Emil Mihaileanu, North York (CA)

(73) Assignee: BlackBerry Limited, Waterloo, Ontario (CA)

( * ) Notice: Subject to any disclaimer, the term of this patent is extended or adjusted under 35 U.S.C. 154(b) by 212 days.

(21) Appl. No.: 13/571,083

(22) Filed: Aug. 9, 2012

(65) Prior Publication Data

US 2014/0043967 A1    Feb. 13, 2014

(51) Int. Cl.
*G01R 31/08* (2006.01)
*H04L 12/825* (2013.01)
*H04L 12/835* (2013.01)
*H04L 12/893* (2013.01)
*H04L 12/911* (2013.01)
*H04L 12/801* (2013.01)

(52) U.S. Cl.
CPC ............... *H04L 47/25* (2013.01); *H04L 47/30* (2013.01); *H04L 47/40* (2013.01); *H04L 47/741* (2013.01); *H04L 47/29* (2013.01); *H04L 47/824* (2013.01)
USPC .......................................... 370/230; 370/235

(58) Field of Classification Search
None
See application file for complete search history.

(56) References Cited

U.S. PATENT DOCUMENTS

| | | | |
|---|---|---|---|
| 6,363,401 B2 | 3/2002 | Yahya et al. | |
| 6,496,504 B1 | 12/2002 | Malik | |
| 6,928,051 B2 | 8/2005 | Butt et al. | |
| 7,876,766 B1 | 1/2011 | Atkins et al. | |
| 2004/0057445 A1* | 3/2004 | LeBlanc | 370/412 |
| 2005/0131986 A1 | 6/2005 | Haagens et al. | |
| 2005/0182960 A1 | 8/2005 | Petry et al. | |
| 2005/0267941 A1 | 12/2005 | Addante et al. | |
| 2005/0278493 A1 | 12/2005 | Lin et al. | |
| 2007/0159965 A1 | 7/2007 | Kopf et al. | |
| 2008/0025307 A1 | 1/2008 | Preiss et al. | |
| 2008/0285447 A1 | 11/2008 | Yamasaki | |
| 2010/0046368 A1* | 2/2010 | Kaempfer et al. | 370/231 |

(Continued)

OTHER PUBLICATIONS

European Patent Office, "Extended European Search Report," issued in connection with European Application No. 12191063.2, dated Nov. 26, 2013, 5 pages.

(Continued)

*Primary Examiner* — Kibrom T Hailu
(74) *Attorney, Agent, or Firm* — Fish & Richardson P.C.

(57) ABSTRACT

A method and apparatus for managing load in a communication network are provided. At a processor of a relay device, a number of messages is determined that are one or more of currently queued for relay via a communication interface of the relay device and previously relayed within a given time period, the communication interface and the processor of the relay device for relaying the messages, via the communication interface, between a plurality of devices and a network infrastructure. At the processor, a rate at which the plurality of devices establishes communications with the network infrastructure is controlled, wherein there is an inverse relationship between the rate and the number of messages.

18 Claims, 10 Drawing Sheets

(56) References Cited

U.S. PATENT DOCUMENTS

| | | |
|---|---|---|
| 2011/0205956 A1 | 8/2011 | Inada |
| 2012/0155627 A1 | 6/2012 | Nair et al. |
| 2012/0159514 A1 | 6/2012 | Sigalov et al. |
| 2012/0163205 A1* | 6/2012 | Zhang et al. ............... 370/252 |
| 2014/0067908 A1* | 3/2014 | Feng et al. ............... 709/203 |

OTHER PUBLICATIONS

The United States Patent and Trademark Office, "Non-final Office action," issued in connection with U.S. Appl. No. 13/571,089, dated Nov. 21, 2013, 23 pages.

European Patent Office, Extended European Search Report issued in European Application No. 12190329.8, dated Jan. 28, 2013, 7 pages.

Zhang Huangbin, iRedMail—Free, Pen Source Email Server Solution, http://www.iredmail.org/features.html, Published Jan. 9, 2010, Accessed: Jun. 27, 2012, 4 pages.

United States Patent and Trademark Office, Office Action issued in connection with U.S. Appl. No. 13/571,089, dated Apr. 25, 2014, 21 pages.

United States Patent and Trademark Office, Office Action issued in connection with U.S. Appl. No. 13/571,089, dated Jul. 17, 2014, 17 pages.

\* cited by examiner

METHOD AND APPARATUS FOR MANAGING LOAD IN A COMMUNICATION NETWORK

FIELD

The specification relates generally to communication networks, and specifically to a method and apparatus device for managing load in a communication network.

BACKGROUND

When communication devices in a communication network have not been within coverage for some period of time, messages associated with those communication devices can accumulate. When the communication devices attempt to connect to a relay device in the network, conduits to and/or from the communication devices can become overloaded due to a large amount of accumulated traffic.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
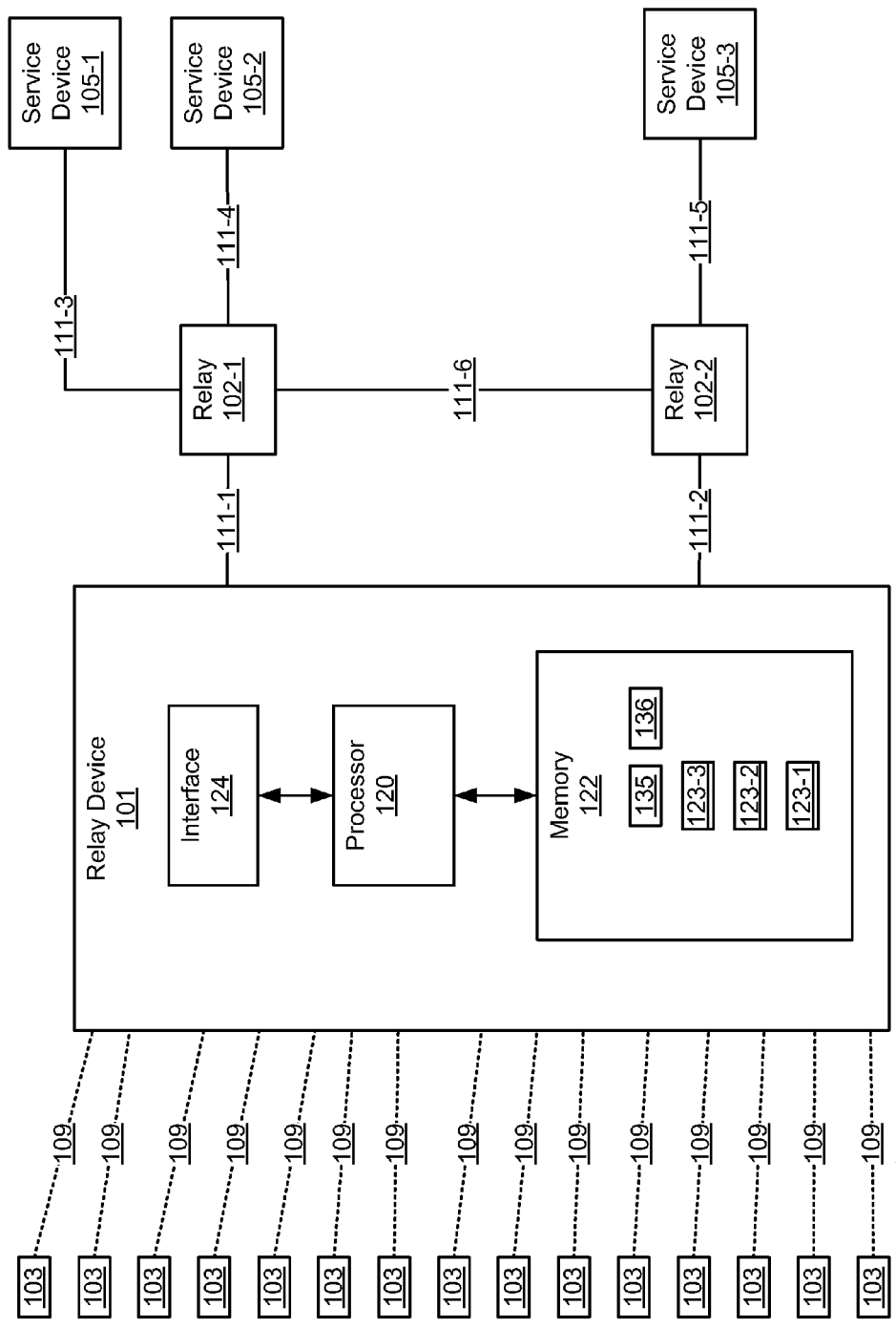
FIG. 1 depicts a system for managing load in a communication network, according to non-limiting implementations.

An aspect of the specification provides a relay device comprising: a communication interface and a processor for relaying messages, via the communication interface, between a plurality of devices and a network infrastructure, the processor enabled to: determine a number of the messages one or more of currently queued for relay via the communication interface and previously relayed within a given time period; and, control a rate at which the plurality of devices establishes communications with the network infrastructure, wherein there is an inverse relationship between the rate and the number of messages.

The network infrastructure can comprise one or more of other relay devices and service devices providing services to the plurality of devices.

The processor can be further enabled to: allow the plurality of devices to establish communications with the network infrastructure in batches; increase the rate by increasing a size of the batches; and decrease the rate by decreasing the size of the batches.

The processor can be further enabled to control the rate by allowing the plurality of devices to establish communications with the network infrastructure in batches, wherein the inverse relationship is between a size of the batches and the number of messages.

The relay device can further comprise a memory storing a plurality of threshold values, and the processor can be further enabled to inversely change the rate as the number of messages rises above each successive threshold value of the plurality of threshold values.

The relay device can further comprise a memory storing a threshold value, and the processor can be further enabled to increase the rate when the number of messages is below the threshold value and maintain a current rate when the number of message is above the threshold value.

The relay device can further comprise a memory storing a threshold value, and the processor can be further enabled to maintain a current rate when the number of messages is below the threshold value and decrease the rate when the number of messages is above the threshold value.

The relay device can further comprise a memory storing a threshold value, and the processor can be further enabled to decrease the rate when the number of messages is below the threshold value and set the rate zero when the number of message is above the threshold value.

The relay device can further comprise a memory storing a first threshold value, a second threshold value and a third threshold value, and the processor can be further enabled to one or more of: increase the rate when the number of messages is below the first threshold value; maintain a current rate when the number of message is between the first threshold value and the second threshold value; decrease the rate when the number of message is between the second threshold value and the third threshold value; and, set the rate zero when the number of message is above the third threshold value.

The relay device can further comprise a front end component of the network infrastructure.

Another aspect of the specification provides a method comprising: determining, at a processor of a relay device, a number of messages one or more of currently queued for relay via a communication interface of the relay device and previously relayed within a given time period, the communication interface and the processor of the relay device for relaying the messages, via the communication interface, between a plurality of devices and a network infrastructure; and, controlling, at the processor, a rate at which the plurality of devices establishes communications with the network infrastructure, wherein there is an inverse relationship between the rate and the number of messages.

The network infrastructure can comprise one or more of other relay devices and service devices providing services to the plurality of devices.

The method can further comprise: allowing the plurality of devices to establish communications with the network infrastructure in batches; increasing the rate by increasing a size of the batches; and decreasing the rate by decreasing the size of the batches.

The method can further comprise controlling the rate by allowing the plurality of devices to establish communications with the network infrastructure in batches, wherein the inverse relationship is between a size of the batches and the number of messages.

The relay device can further comprise a memory storing a plurality of threshold values, and the method can further comprise inversely changing the rate as the number of messages rises above each successive threshold value of the plurality of threshold values.

The relay device can further comprise a memory storing a threshold value, and the method can further comprise increasing the rate when the number of messages is below the threshold value and maintaining a current rate when the number of message is above the threshold value.

The relay device can further comprise a memory storing a threshold value, and the method can further comprise maintaining a current rate when the number of messages is below the threshold value and decreasing the rate when the number of messages is above the threshold value.

The relay device can further comprise a memory storing a threshold value, and wherein the method can further comprise decreasing the rate when the number of messages is below the threshold value and setting the rate zero when the number of message is above the threshold value.

The relay device can further comprise a memory storing a first threshold value, a second threshold value and a third threshold value, and the method can further comprise one or more of: increasing the rate when the number of messages is below the first threshold value; maintaining a current rate when the number of message is between the first threshold value and the second threshold value; decreasing the rate when the number of message is between the second threshold value and the third threshold value; and, setting the rate zero when the number of message is above the third threshold value.

Yet a further aspect of the specification provides a computer program product, comprising a computer usable medium having a computer readable program code adapted to be executed to implement a method comprising: determining, at a processor of a relay device, a number of messages one or more of currently queued for relay via a communication interface of the relay device and previously relayed within a given time period, the communication interface and the processor of the relay device for relaying the messages, via the communication interface, between a plurality of devices and a network infrastructure; and, controlling, at the processor, a rate at which the plurality of devices establishes communications with the network infrastructure, wherein there is an inverse relationship between the rate and the number of messages. The computer usable medium can comprise a non-transitory computer usable medium.

FIG. 1 depicts a system 100 comprising a relay device 101, a first relay 102-1, a second relay 102-2, a plurality of communication devices 103, and service devices 105-1, 105-2, 105-3, according to non-limiting implementations. Relay device 101 will interchangeably be referred to hereafter as device 101. Relays 102-1, 102-2 will interchangeably be referred to hereafter, collectively, as relays 102 and generically as a relay 102. Communications devices 103 will be interchangeably referred to hereafter, collectively as devices 103, and generically as a device 103. Service devices 105-1, 105-2, 105-3 will be interchangeably referred to hereafter as, collectively, as service devices 105, and generically as a service device 105. It is yet further appreciated that device 101 can establish communications with each device 103 via a respective link 109. Device 101, relays 102 and service devices 105 are all in communication via respective links 111-1, 111-2, 111-3, 111-4, 111-5, 111-6 (which will interchangeably be referred to hereafter, collectively, as links 111 and generically as a link 111).

Device 101 further comprises a processor 120 interconnected with a memory 122 and a communication interface 124. Communication interface 124 will interchangeably be referred to hereafter as an interface 124. Memory 122a further stores a plurality of threshold values 123-1, 123-2, 123-3 (which will interchangeably be referred to hereafter, collectively, as thresholds 123 and generically as a threshold 123). Memory 122 further stores an application 135 which, when processed by processor 120, enables processor 120 to control access of devices 103 to network infrastructure, as described in further detail below. As will also be described in further detail below, in some implementations, memory 122 also stores given time period data 136 indicative of a time period during which a history of a number of messages previously relayed by device 101 is established.

It is further appreciated that system 100 can comprise any suitable number of devices 103, including hundreds to thousands to millions of devices. For example, system 100 can comprise handheld devices that are associated with accounts managed by an entity that operates at least a portion of a communication network (e.g. a communication network represented by at least a portion of links 109, a communication network associated with device 101, and the like). For example, a user of device 103 can subscribe to services provided by the entity. As such, the entity can comprise a carrier operating at least a portion of a network. As carriers are generally enabled to provide services to hundreds of thousands and even millions of subscribers, the number of devices in system 100 can be commensurate with a number of devices operated by a carrier.

Device 101, relays 102 and service devices 105 are generally appreciated to be components of a communications network; hence, associated network infrastructure can comprise at least relays 102 and service devices 105, with device 101 acting as a front end component and/or a front end device and/or as a gateway device to the network infrastructure. As such, device 101 is generally enabled to control access of devices 103 to the network infrastructure, as will be described hereafter.

It is further appreciated that relays 102 are generally enabled to relay messages and/or data between devices 103 and service devices 105, via device 101. For example, each of devices 103 can transmit messages and/or data to service devices 105, when allowed by device 101, using respective services associated with service devices 105, including, but not limited to messages for forwarding onto another device 103, internet browser requests and the like. In turn, service devices 105 can transmit messages and/or data to devices 103 via device 101, including, but not limited to messages received from other devices 103.

It is yet further appreciated that system 100 can comprise any suitable number of relays similar to relays 102, for example in regional, national, and worldwide networks; indeed, when system 100 comprises a worldwide network of relays, a number of relays 102 can be large (e.g. thousands, hundreds of thousands and the like).

Service devices 105 each generally comprise a device enabled to provide a respective service to one or more of devices 103, including, but not limited to, a message service, an email service, a text message service, an internet browsing service and the like. For example, each of service devices 105 can comprise one or more of a message server, an email server, a text message server, an internet server, a proxy server and the like. Further some of service devices 105 can be redundant with other service devices: in other words, two or more service devices 105 can offer the same service to provide redundancy and load balancing in system 100.

It is yet further appreciated that system 100 can comprise any suitable number of service devices 105, for example in regional, national, and worldwide networks; indeed, when system 100 comprises a worldwide network of relays, a number of service device 105 can be large (e.g. thousands, hundreds of thousands, millions and the like).

It is further appreciated that each relay 102 can be in communication with one or more services devices 105. For example, relay 102-1 is in communication with two services devices 105, and hence relay 102-1 offers access to two services. While not depicted, some relays 102 may not be in communication with any service devices 105, but relay messages and/or data to other relays 102, which in turn relay messages and/or data to one or more service devices 105. Hence, in some implementations, messages and/or data in system 100 can be propagated by hopping between relays 102. However, in other implementations, device 101 and relays 102 in system 100 are in communication with all other relays 102 in system 100, hence messages and/or data can be propagated between device 101 and relays 102 in a single hop between device 101 and a relay 102 and/or a single hop between respective relays 102.

Figure 2:
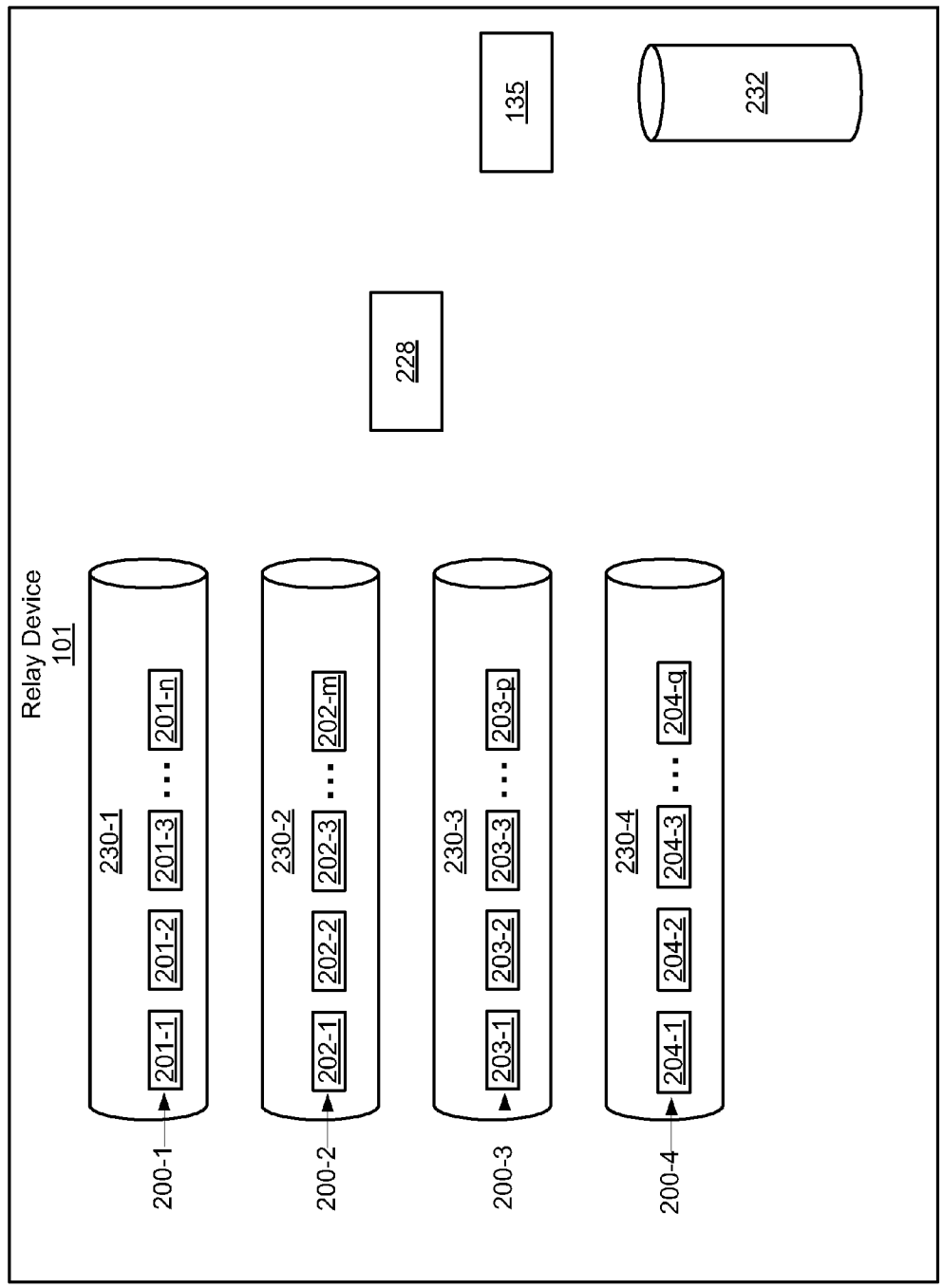
FIG. 2 depicts a schematic diagram of a relay device of the system of FIG. 1 showing elements related to relay processes, according to non-limiting implementations.

Attention is next directed to FIG. 2 which depicts a subset of elements of device 101, but it is appreciated that all elements of device 101 are nonetheless present. For example, while device 101 generally comprises a processor 120, memory 122 and interface 124, they are not depicted in FIG. 2, but are nonetheless appreciated to be present. Specifically, FIG. 2 provides a schematic diagram of device 101 showing elements related to relay processes: a relay manager 228, connection objects 230-1, 230-2, 230-3, 230-4 and a routing table 232. Connection objects 230-1, 230-2, 230-3, 230-4 will interchangeably be referred to hereafter collectively as connection objects 230 and generically as a connection object 230.

In any event, processor 120 is generally enabled to operate relay manager 228 for managing connection objects 230. Furthermore memory 122 stores a routing table 232 for storing associations between connection objects 230 and relays 102. For example: connection object 230-1 comprises a queue 200-1 of outbound messages 201-1, 201-2, 201-3 . . . 201-$n$ to be transmitted to relay 102-1 received from other relays 102 and/or from devices 103 and/or from service devices 105; connection object 230-2 comprises a queue 200-2 of inbound messages 202-1, 202-2, 202-3 . . . 202-$m$ received from relay 102-1 for relaying to other relays 102 and/or to devices 103 and/or to service devices 105; connection object 230-3 comprises a queue 200-3 of outbound messages 203-1, 203-3, 201-3.201-$p$ to be transmitted to relay 102-2 received from other relays 102 and/or from devices 103 and/or from service devices 105; and connection object 230-4 comprises a queue 200-4 of inbound messages 204-1, 204-2, 204-3 . . . 204-$q$ received from relay 102-2 for relaying to other relays 102 and/or to devices 103 and/or to service devices 105.

Queues 200-1, 200-2, 200-3 . . . 200-4 will interchangeably be referred to hereafter collectively as queues 200 and generically as a queue 200.

Messages 201-1, 201-2, 201-3 . . . 201-$n$ will interchangeably be referred to hereafter collectively as messages 201 and generically as a message 201.

Messages 202-1, 202-2, 202-3 . . . 202-$m$ will interchangeably be referred to hereafter collectively as messages 202 and generically as a message 202.

Messages 203-1, 203-3, 201-3 . . . 201-$p$ will interchangeably be referred to hereafter collectively as messages 203 and generically as a message 203.

Messages 204-1, 204-2, 204-3 . . . 204-$q$ will interchangeably be referred to hereafter collectively as messages 204 and generically as a message 204.

It is yet further appreciated that processor 120 can provide relay manager 228 and connection objects 230 by processing an application 135 stored at memory 122; for example, application 135 can comprise an application for relaying messages and managing relaying of messages. Hence processor 120 processes application 135 to operate relay manager 228 and connection objects 230.

Further, relay manager 228 is generally enabled to manage which messages 201, 202, 203, 204 are in each queue 200. For example, relay manager 228 can further move inbound messages 202, 204 to an outbound connection object 230-1, 230-3: in other words, relay manager 228 can further manage relaying of messages received from one relay 102-1, 101-3 to another relay 102-1, 101-3 and/or to service devices 105 and/or to device 103.

Further, messages 201 received at device 101 for relay to service devices 105-1, 105-2 are queued in connection object 230-1 for relay to relay 102-1 as routing table 232 stores data indicative that service devices 105-1, 105-2 are in communication with relay 102-1. Similarly, messages 203 received at device 101 for relay to service device 105-3 are queued in connection object 230-3 for relay to relay 102-2 as routing table 232 stores data indicative that service device 105-3 is in communication with relay 102-2.

It is yet further appreciated that at least a portion of each of messages 202, 204 inbound from relays 102 are for relay to one or more of devices 101. It is yet further appreciated that initially, in system 100, not all of devices 103 are in communication with device 101 and/or not all of devices 103 are being allowed access to network infrastructure of system 100 (i.e. relays 102 and/or services devices 105) by device 101. Hence, at least a portion of messages 202, 204 are accumulating at device 101 until respective associated devices 101 are allowed access to network infrastructure.

For example, messages 202, 204 can be received from one or more of service devices 105, devices 103 that at least previously had access to network infrastructure, and/or from devices in other communications networks in communication with system 100, for example, communication networks associated with other entities, other carriers and the like.

Indeed, it is further appreciated that not all connection objects 230 are depicted in FIG. 2, and device 101 can comprise any suitable number of connection objects 230. For example, device 101 can comprise more than one connection object 230 for exchanging messages with each of relays 102. Further, device 101 can be in communication with relays other than relays 102, and hence, device 101 can comprise connection objects 230 for exchanging messages with each of the other relays with which device 101 is connected. Further, device 101 can comprise at least one connection object 230 for exchanging messages with each device 103, including, but not limited to, an inbound connection object associated with each device 103 and an outbound connection object associated with each device 103. It is yet further appreciated that processor 120 can establish respective new connection objects 230 associated with a given device 103 when providing access of the given device 103 to the network infrastructure.

It is yet further appreciated that each connection object 230 can comprise and/or be connected to respective TCP/IP (Transmission Control Protocol/Internet Protocol) connections and/or ports at device 101. Alternatively, each connection object 230 can comprise and/or be connected to UDP (User Datagram Protocols) connections.

It is yet further appreciated that relay manager 228 and connection objects 230 can comprise one or more of hardware and software components. For example, logic for configuring relay manager 228 and connection objects 230 can be provided at applications 135, but each of connection objects 230 can further comprise at least a portion of one or more of processor 120, memory 122, and interface 124.

It is further appreciated that elements of device 101 described with reference to FIG. 2 are not to be considered particularly limiting. For example, while relay manager 228 and connection objects 230 are described with reference to device 101, in other implementations functionality of relay manager 228 and/or connection objects 230 can be distributed between other elements of device 101, and indeed, device 101 need not have specific elements that performs all the functionality of the described relay manager 228 and connection objects 230.

While not depicted, it is yet further appreciated that each relay 102 comprises respective processors, memories, interfaces, relay managers, or the like, connection objects, or the like, and routing tables for communicating with device 101, devices 103, other relays 102 and/or respective service devices 105. Indeed, at least the relay functionality of each relay 102 can be similar to the relay functionality of device 101.

It is yet further appreciated that each of device 101, relays 102 and service devices 105 can generally be remote from one another.

Attention is next directed back to FIG. 1, and components of system 100 will be described hereafter.

Each of device 101 and relays 102 can be any type of relay device and/or routing device and/or switching device that can be used to perform any suitable functions for relaying messages and/or data. Each of device 101 and relays 102 includes, but is not limited to, any suitable combination of communication devices, relay devices, routing devices, relay servers, routing servers, switches, switching devices and the like. Each of device 101 and relays 102 can be based on any well-known relay and/or router environment including a module that houses one or more central processing units, volatile memory (e.g. random access memory), persistent memory (e.g. hard disk devices) and network interfaces to allow device 101 and relays 102 to communicate over respective links 109, 111. In some implementations, one or more of device 101 and relays 102 can comprise one or more of a router and a switch.

For example, each of device 101 and relays 102 can comprise a suitable relay device and/or routing device and/or switching device running a suitable system, each of device 101 and relays 102 comprising one or more central processing units (including but not limited to processor 120 at device 101) random access memory (including but not limited to memory 122 at device 101, which can comprise any suitable combination of volatile and non-volatile memory). However, it is to be emphasized that a vast array of computing environments for each of device 101 and relays 102 are contemplated. It is further more appreciated that each of device 101 and relays 102 can comprise any suitable number of relay devices and/or routing devices and/or switching devices.

Each of devices 103 can be any type of electronic device that can be used in a self-contained manner. Devices 103 can include, but are not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations. Each device 103 can be based on any well-known computing environment including a module that houses one or more central processing units, volatile memory (e.g. random access memory), persistent memory (e.g. hard disk devices, flash memory devices) and network interfaces to allow each device 103 to communicate over a respective link 109.

Further, each device 103 can be associated with an account for which a given service can, in turn, be associated. For example, each device 103 can be enabled to interact with device 101 to access network infrastructure to communicate with service devices 105 for email messaging, text messaging, internet browsing and the like, and a respective subscriber associated with a device 103 can pay the entity for providing coverage of a device 103 via device 101 and/or for a given service associated with service devices 105.

Each of links 109, 111 comprises any suitable link for respectively enabling device 101, relays 102, devices 103 and service devices 105 to communicate with each other. Links 109, 111 can hence each include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), access points, and the like, and/or a combination.

However, initially, each link 109 need not be established as devices 103 can be out of coverage of an associated communication network (e.g. one or more devices 103 can be turned off, respective radios can be turned off, one or more devices can be geographically far from an access point, and the like).

It is yet further appreciated that even when a respective link 109 is established between a given device 103 and device 101, the given device 101 will not have access to network infrastructure: hence each of links 109 is drawn in stippled lines in FIG. 1 to indicate communication with device 101, for example to exchange connection data and the like, but lack of access to network infrastructure of relays 102 and service devices 104.

It is appreciated that FIG. 1 further depicts a schematic diagram of device 101 according to non-limiting implementations. It should be emphasized that the structure of device 1-1 in FIG. 1 is purely an example, and contemplates a device enabled to control access of devices 103 to network infrastructure in system 100. However, while FIG. 1 contemplates device 101 enabled to control access of devices 103 to network infrastructure, in other implementations, each device 101 can comprise a device enabled for both controlling access of devices 103 to network infrastructure and providing services: for example, device 101 can both implement network access functionality and provide services similar to service devices 105.

Processor 120 (which can be implemented as a plurality of processors, including but not limited to one or more central processors (CPUs)) is configured to communicate with each memory 122 comprising a respective non-volatile storage unit (e.g. Erasable Electronic Programmable Read Only Memory ("EEPROM"), Flash Memory) and a respective volatile storage unit (e.g. random access memory ("RAM")). Programming instructions that implement the functional teachings of device 101 as described herein are typically maintained, persistently, in memory 122 and used by processor 120 which makes appropriate utilization of respective volatile storage during the execution of such programming instructions. Those skilled in the art recognize that memory 122 is an example of computer readable media that can store programming instructions executable on active processor 120. Furthermore, memory 122 is also an example of a memory unit and/or memory module.

In particular, it is appreciated that memory 122 stores application 135 that, when processed by a processor 120, enables processor 120 to control access to network infrastructure in system 100. Further, as described in further detail below, processing of application 135 by processor 120 enables processor 120 to: relay messages, via communication interface 124, between plurality of devices 103 and a network infrastructure; determine a number of the messages one or more of currently queued for relay via the communication interface 124 and previously relayed within a given time period; and, control a rate at which the plurality of devices 103 establishes communications with the network infrastructure, wherein there is an inverse relationship between the rate and the number of messages.

Memory 122 further stores thresholds 123 which can be used to control the rate at which the plurality of devices 103 establishes communications with the network infrastructure, wherein there is an inverse relationship between the rate and the number of messages one or more of currently queued for relay via communication interface 124 and previously relayed within a given time period. Hence, memory 122 also stores time given period data 136 indicative of the given time period.

It is yet further appreciated that application 135 is an example of programming instructions stored at a memory 122.

Further, while application 135 and given time period data 136 are shown as distinct in FIG. 1, in other implementations application 135 can comprise given time period data 136; in other words given time period data 136 can be provided in logic associated with application 135. In yet further implementations, given time period data 136 can be dynamic and/or updated by an administrator device (not depicted) of system 100.

Processor 120 also connects to interface 124, which can be implemented as one or more connectors and/or network adaptors and/or radios, configured to communicate with devices 103 and/or relays 102 and/or service devices 105 via respective links 109, 111. In general, it will be appreciated that interface 124 is configured to correspond with the network architecture that is used to implement respective links 109, 111 as described above. In other implementations a plurality of links with different protocols can be employed at each relay 102 and thus a respective interface 124 can comprise a plurality of interfaces to support each type of respective link. In any event, it is appreciated that any suitable combination of interfaces is within the scope of present implementations.

It is yet further appreciated that: at device 101, each of connection objects 230 receives and/or transmits messages via interface 124.

Further, it should be understood that in general a wide variety of configurations for device 101 are contemplated.

It is yet further appreciated that each of service devices 105 can comprise relay functionality as well as service functionality and can be similar, at least in part to one or more of device 101 and/or relays 102, and hence comprises at least a respective processor, a respective communication interface and a respective memory, the respective processor for carrying out processing instructions stored at the respective memory to provide the functionality of service devices 105.

Figure 3:
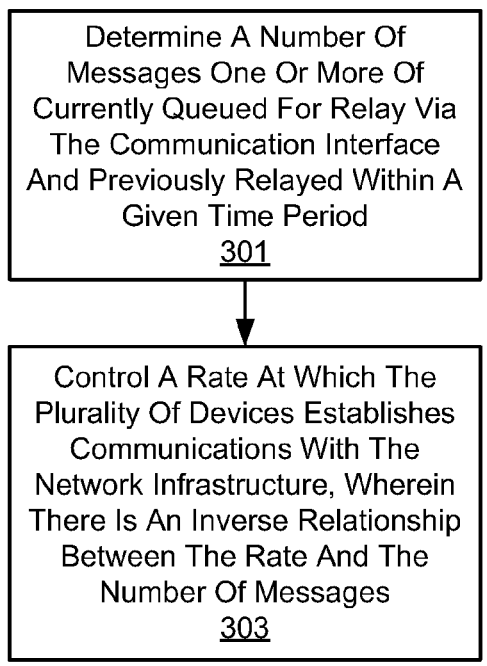
FIG. 3 depicts a flowchart of a method for managing load in a communication network implementable in the device of FIG. 2, according to non-limiting implementations.

Attention is now directed to FIG. 3 which depicts a flowchart of a method 300 for managing load in a communication network, according to non-limiting implementations. In order to assist in the explanation of method 300, it will be assumed that method 300 is performed using system 100. Furthermore, the following discussion of method 300 will lead to a further understanding of system 100 and its various components. However, it is to be understood that system 100 and/or method 300 can be varied, and need not work exactly as discussed herein in conjunction with each other, and that such variations are within the scope of present implementations.

It is appreciated that, in some implementations, method 300 is implemented in system 100 by processor 120 of device 101. Indeed, method 300 is one way in which device 101 can be configured. It is to be emphasized, however, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of system 100 as well.

Figure 4:
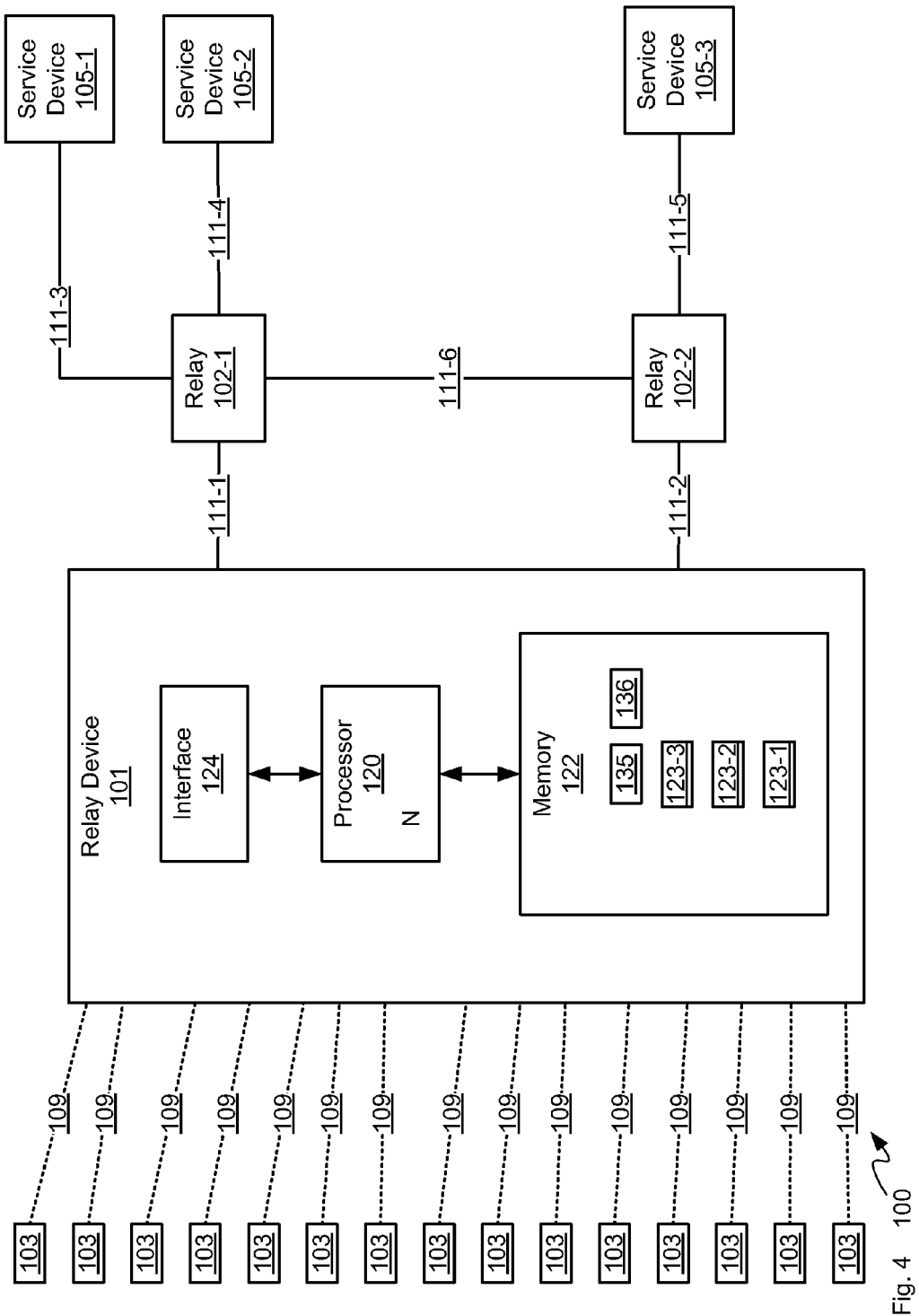
FIG. 4 depicts the system of FIG. 1 when the device of FIG. 2 counts a number of messages, according to non-limiting implementations.

Further, method 300 is described with reference to FIG. 4, which is similar to FIG. 1, with like elements having like numbers.

It is assumed in method 300 that device 101 comprises interface 124 and processor 120, processor 120 generally enabled for relaying messages, via interface 124, between plurality of devices 103 and network infrastructure, for example relays 102 and/or service devices 105.

At block 301, processor 120 determines a number of messages one or more of currently queued for relay via interface 124 and previously relayed within a given time period as indicated by given time period data 136. In other words, processor 120 is further enabled to maintain a count of messages one or more of queued for relay at connection objects 230, and relayed by device 101 within the given time period indicated by given time period data 136, for example a previous 5 minutes, a previous 10 minutes and the like from a current time. The count of messages can include a number of messages 201, 202, 203, 204 queued at each connection object 230 and/or a number of messages 202, 204 queued at inbound connection objects 230-3, 230-4 for relay to devices 103. Rules for determining which of messages 201, 202, 203, 204 that are to be included in the count can be provided at application 135 and/or dynamically configured (e.g. dynamically increased or decreased if relaying capacity at system 100 is decreasing or increasing too quickly or too slowly) and/or configured via an administrative device (not depicted)

in communication with device 101. In any event, as depicted in FIG. 4, processor 120 determines a number of messages "N".

At block 303, processor 120 controls a rate at which the plurality of devices 103 establishes communications with the network infrastructure (e.g. relays 102, services devices 105), wherein there is an inverse relationship between the rate and the number of messages, N. In other words, the higher the number of messages, the lower the rate at which the plurality of devices 103 establish communications with the network infrastructure, and vice versa.

It is further appreciated that, when establishing communications between a given device 103 and the network infrastructure, processor 120: receives messages and/or data from the given device 103 and queues the messages and/or data in outbound connection objects 230-1, 230-3 for relay to relays 102 and/or service devices 105; and further relays messages and/or data from relays 102 and/or service devices 105 to the given device 103. Further device 101 establishes inbound and outbound connection objects associated with the given device 103. Otherwise, to block access between a given device 103 and the network infrastructure, processor 120: refuses to receive messages and/or data from the given device 103, but queues the messages and/or data for the given device 103 received from the network infrastructure in inbound connection objects 230-2, 230-4.

The inverse relationship between rate and number of messages, N, can comprise any suitable inverse relationship as long as the rate increases as the number of messages, N decreases and the rate decreases as the number of messages N increases. In some implementations the relationship can be inversely proportional, inversely exponential, and the like.

However, in depicted implementations, the relationship between rate and the number of messages is threshold based: it is further appreciated that memory 122 stores threshold values 123, and at block 303 processor 120 can inversely change the rate as the number of messages N rises above each successive threshold value 123 of the plurality of threshold values 123. In other words, first threshold value 123-1 is less than second threshold value 123-2, and second threshold value 123-2 is less than third threshold value 123-3, and as the number of messages rises above each threshold 123, the rate generally decreases.

Figure 5:
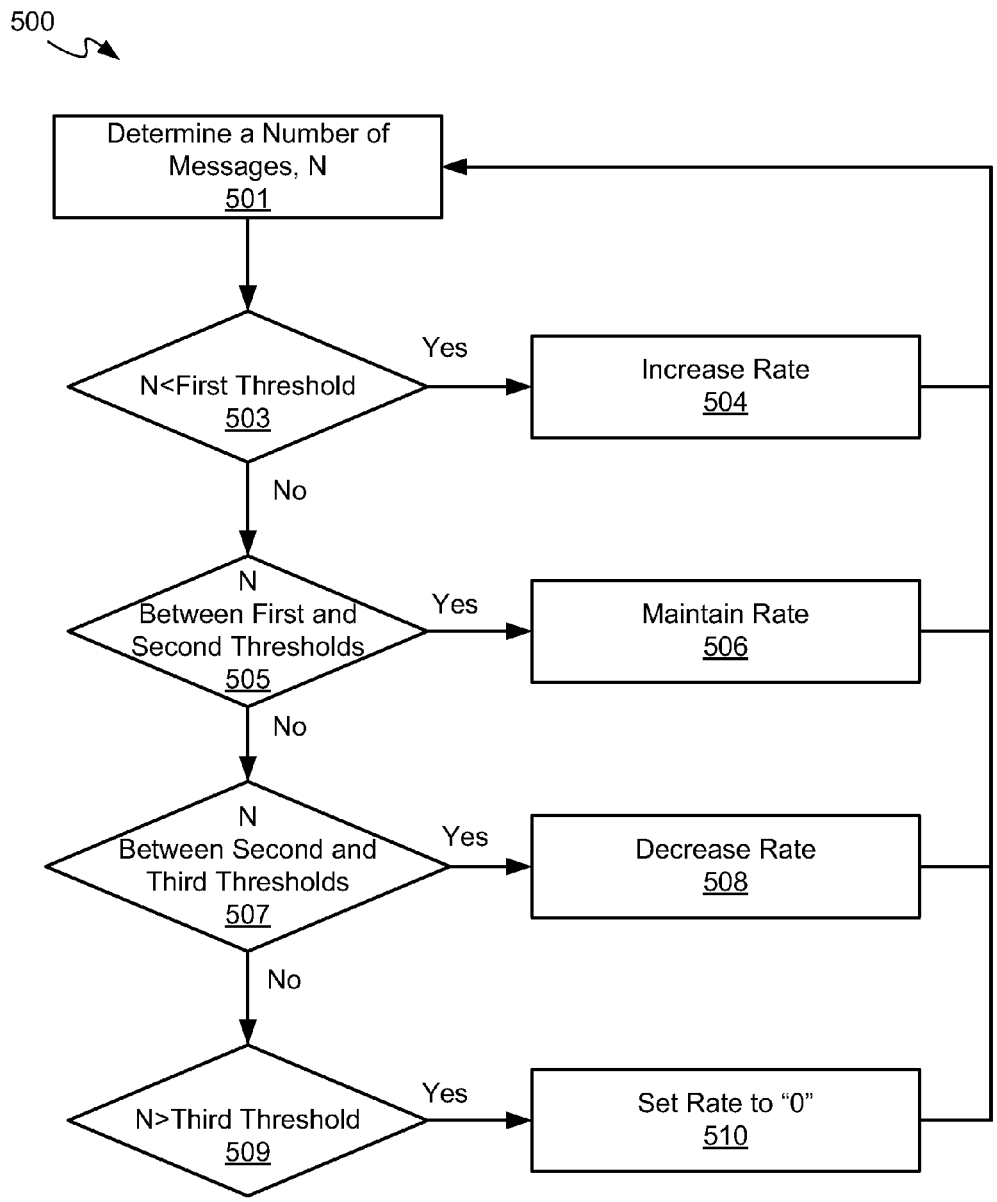
FIG. 5 depicts a flowchart of a threshold based method for managing load in a communication network implementable in the device of FIG. 2, according to non-limiting implementations.

For example, attention is next directed to FIG. 5, which depicts a flowchart of a method 500 for managing load in a communication network using thresholds, according to non-limiting implementations. In order to assist in the explanation of method 500, it will be assumed that method 500 is performed using system 100. Furthermore, the following discussion of method 500 will lead to a further understanding of system 100 and its various components. However, it is to be understood that system 100 and/or method 500 can be varied, and need not work exactly as discussed herein in conjunction with each other, and that such variations are within the scope of present implementations.

It is appreciated that, in some implementations, method 500 is implemented in system 100 by processor 120 of device 101. Indeed, method 500 is one way in which device 101 can be configured. It is to be emphasized, however, that method 500 need not be performed in the exact sequence as shown, unless otherwise indicated; and likewise various blocks may be performed in parallel rather than in sequence; hence the elements of method 500 are referred to herein as "blocks" rather than "steps". It is also to be understood, however, that method 500 can be implemented on variations of system 100 as well.

It is further appreciated that method 500 is a variant of method 300, and each block in method 300 corresponds to one or more blocks of method 300.

For example, block 501 is similar to block 301 in that processor 120 determines a number of messages, N, as described above.

Further, block 303 of method 300 comprises blocks 503 to 510 of method 500, and blocks 503 to 510 are one way in which processor 120 can be configured to control the rate at which the plurality of devices 103 establishes communications with the network infrastructure.

At block 503, processor 120 determines whether the number of messages, N is below first threshold 123-1; if so (i.e. a "Yes" decision at block 503), at block 504, processor 120 increases the rate.

Otherwise at block 505 (i.e. a "No" decision has occurred at block 503), processor 120 determines whether the number of messages N is between first threshold 123-1 and second threshold 123-2; if so (i.e. a "Yes" decision at block 505), at block 506, processor 120 maintains the current rate.

While at block 506 the current rate is maintained, there is still an overall trend towards decreasing the rate when the number of messages decrease as, otherwise (i.e. a "No" decision has occurred at block 505), at block 507, processor 120 determines whether the number of messages N is between second threshold 123-2 and third threshold 123-3; if so (i.e. a "Yes" decision at block 507), at block 506, processor 120 decreases the rate.

Otherwise at block 509, processor 120 determines whether the number of messages N is between above third threshold 123-3; if so (i.e. a "Yes" decision at block 509), at block 510, processor 120 set the rate to "0" and no further maintains the current rate. In other words, no new devices 103 can access network infrastructure until the number of messages, N, is reduced. It is further appreciated that a "No" decision is not possible at block 509 as it has already been determined at blocks 503, 505 and 507 that "N" is not less than third threshold 123-3.

After each block 504, 506, 508, 510, processor 120 again determines a number of messages at block 501 and method 500 repeats such that device 101 repeatedly adjusts the rate at which the plurality of devices 103 establishes communications with the network infrastructure. It is further appreciated that method 500 can be repeated after each block 504, 506, 508, 510 in a relatively constant manner and/or method 500 is repeated periodically, for example every 5 minutes, every 10 minutes and the like, to allow time for the number of messages N to change substantially. For example, after new devices 103 are allowed to communicate with the network infrastructure, the number of messages N can decrease as the queued messages at device 101 are relayed to their respective associated devices 103.

It is yet further appreciated that blocks 503, 505, 507, 509 can occur in any order and/or in parallel with each other. When performed in a different order than that described, a "No" decision at one of blocks 503, 505, 507, 509 will cause method 500 to advance to a next block 503, 505, 507, 509.

It is yet further appreciated that while three thresholds 123 are provided in present implementations, in other implementations, other numbers of thresholds can be provided associated with any suitable actions for providing the inverse relationship between rate and the number of messages. For example, single threshold can be used below which rate is increased and above which rate is decreased.

Nonetheless, in present implementations, memory 122 stores threshold value 123-1, and processor 120 is enabled to increase the rate when the number of messages is below the threshold value 123-1 and maintain a current rate when the number of message is above the threshold value 123-1. Further, memory 122 stores threshold value 123-2 such that processor 120 is enabled to maintain a current rate when the number of messages is below threshold value 123-2 and decrease the rate when the number of messages is above the threshold value 123-2. Further, memory 122 stores a threshold value 123-3 such that processor 120 is further enabled to decrease the rate when the number of messages is below the threshold value 123-3 and set the rate zero when the number of message is above the threshold value 123-3.

The values of each threshold value 123 can be determined empirically depending on how system 100 responds to various numbers of messages. For example, it is appreciated that the first threshold value 123-1 comprises a first number of messages, below which system 100 is operating below capacity. Similarly, second threshold value 123-1 comprises a second number of messages above which system 100 is operating above capacity. Further, each of first threshold 123-1 and second threshold 123-2 are respectively indicative of numbers of messages between which system 100 is at a normal operating capacity. Finally, third threshold 123-3 comprises a third number of messages above which system 100 is in a critical operating capacity and there is danger of, for example, crashing device 101 due to the number of messages N being too many for device 101 to process and/or exceeding a bandwidth between device 101 and devices 103. Hence, first threshold 123-1 can be referred to as a low threshold, second threshold 123-2 can be referred to as high threshold, and third threshold 123-2 can be referred to a critical threshold.

It is yet further appreciated that device 101 can control and/or adjust the rate at which the plurality of devices 103 establishes communications with the network infrastructure in any suitable manner. For example, devices 103 can be allowed to communicate with network infrastructure in a sequence, while in other implementations, device 101 (e.g. processor 120) can be enabled to devices 103 can be enabled to allow the plurality of devices 103 to establish communications with the network infrastructure in batches; the rate can hence be increased by increasing a size of the batches, and decreased by decreasing the size of the batches. In other words, the inverse relationship between rate and the number of messages is between a size of the batches and the number of messages.

Controlling the rate at which the plurality of devices 103 establishes communications with the network via controlling a size of the batches of devices 103 is now described with reference to FIGS. 6 to 9, each of which are substantially similar to FIG. 1 with like elements having like numbers.

Further, while FIGS. 6 to 9 will be described with reference to batch sizes of devices 103 being on the order of less than ten devices per batch, it is appreciated that batches can be of any suitable size, including hundreds to thousands of devices 103 per batch. It is further appreciated that while changes in batch size are described as being on the order of a few devices 103 per change in batch size, changes in batch size can be orders of magnitude: for example batch sizes can increase from about one hundred devices 103 per batch to about one thousand devices 103 per batch to about ten thousand devices 103 per batch, depending on capacity and/or bandwidth of system 100 and available processing and/or relaying resources at device 101 and/or relays 102 and/or service devices 105. Further the changes in batch size can be predetermined and stored in memory 122, for example in association with application 135.

It is yet further appreciated that, in some implementations, batches of devices 103 are allowed to establish communications with the network infrastructure with a given periodicity, for example one batch every minute, every 5 minutes, every 10 minutes and the like. For example, the periodicity of batches of devices establishing communications with network infrastructure can be similar to the periodicity of implementation of method 500, as described above.

Figure 6:
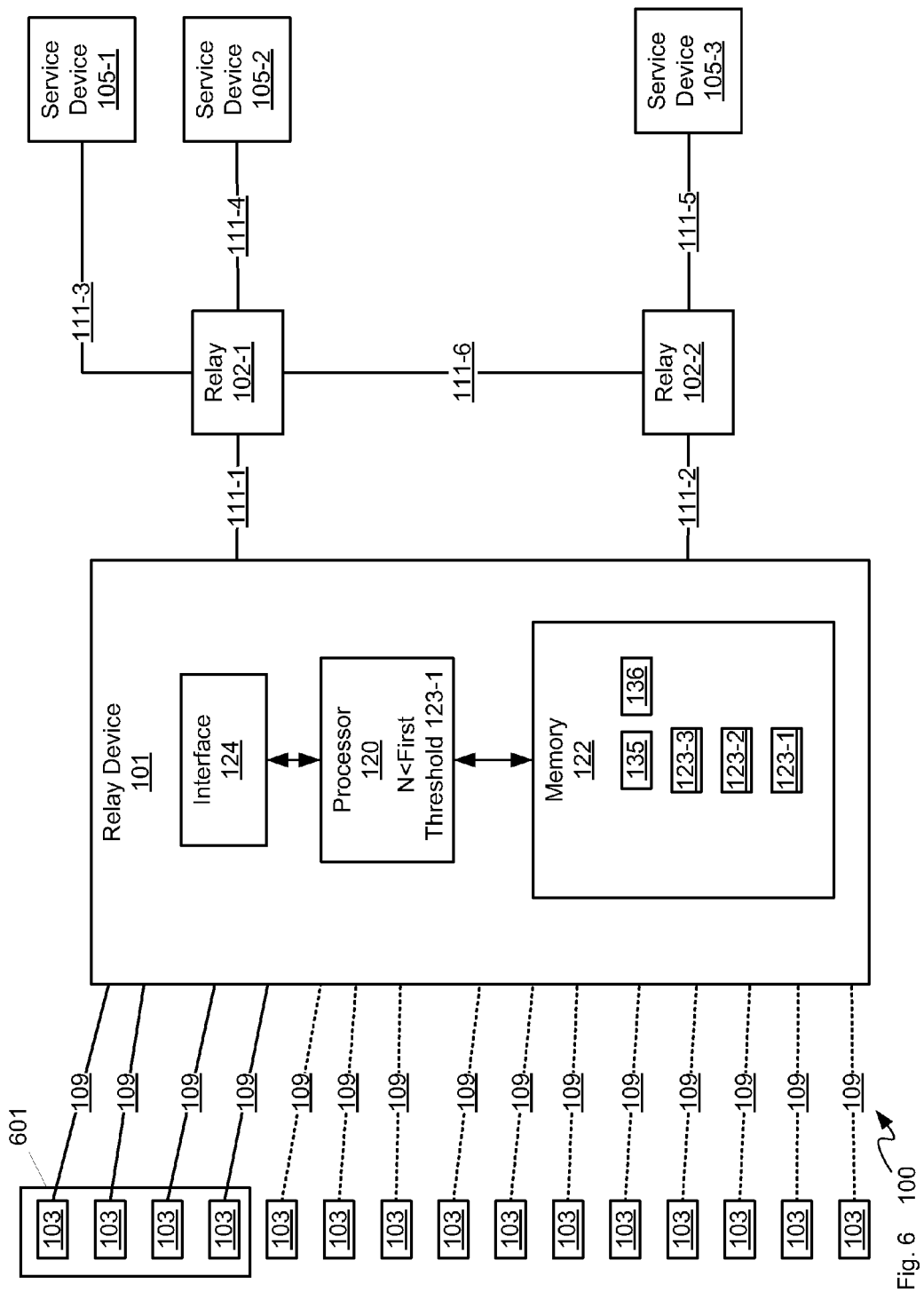
FIG. 6 depicts the system of FIG. 1 when the device of FIG. 2 controls a batch based rate at which communication devices are allowed to communicate with network infrastructure, when a number of messages is below a low threshold, according to non-limiting implementations.

In any event, at FIG. 6, it is initially assumed that a batch size is less than four devices 103. However, processor 120 determines that a number of messages N is less than threshold 123-1, hence batch size is increased to four devices 103 and a batch 601 of four devices 103 is allowed to establish communications with the network infrastructure, as indicated by associated link 109 being depicted in solid lines rather than stippled lines.

It is further appreciated that, prior to allowing devices 103 in batch 601 to establish communications with the network infrastructure, each of devices 103 in batch 601 have exchanged network credentials, and the like, with device 101 and generally requested access to network infrastructure. Indeed, it is appreciated that this is true regardless of whether devices 103 are allowed to establish communications with network infrastructure or any other manner. Further, more devices 103 than those in batch 601 can be have requested access to network infrastructure, and device 101 can be enabled to select a subset of these devices 103 for batch 601 in any suitable manner including, but not limited to, randomly, in a priority of based on when each of the devices 103 requested access, in a priority based on a priority of an associated account (e.g. a user can have paid for priority access), geographically and the like.

Figure 7:
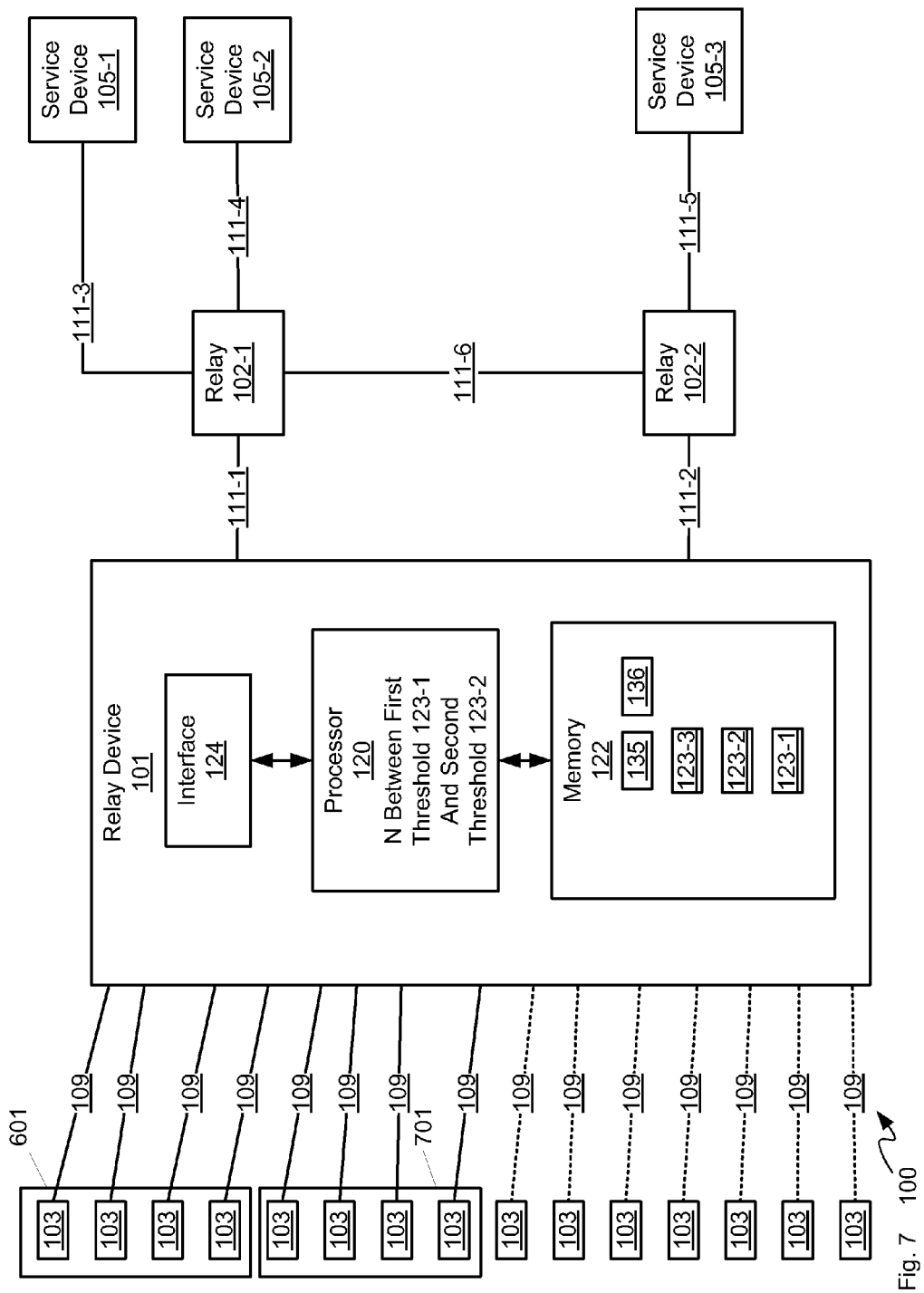
FIG. 7 depicts the system of FIG. 1 when the device of FIG. 2 controls a batch based rate at which communication devices are allowed to communicate with network infrastructure, when a number of messages is between a low threshold and a high threshold, according to non-limiting implementations.

In any event, attention is next directed to FIG. 7 where processor 120 determines, after a period of time relative to FIG. 6, that the number of messages, N, has increased to between first threshold 123-1 and second threshold 123-2; for example, the number of messages N can increase due to devices 103 in batch 601 transmitting large numbers of messages and/or data. In any event, as the number of messages, N, has increased to between first threshold 123-1 and second threshold 123-2, the batch size is maintained and another batch 701 of four devices 103 is allowed to establish communications with the network infrastructure.

Figure 8:
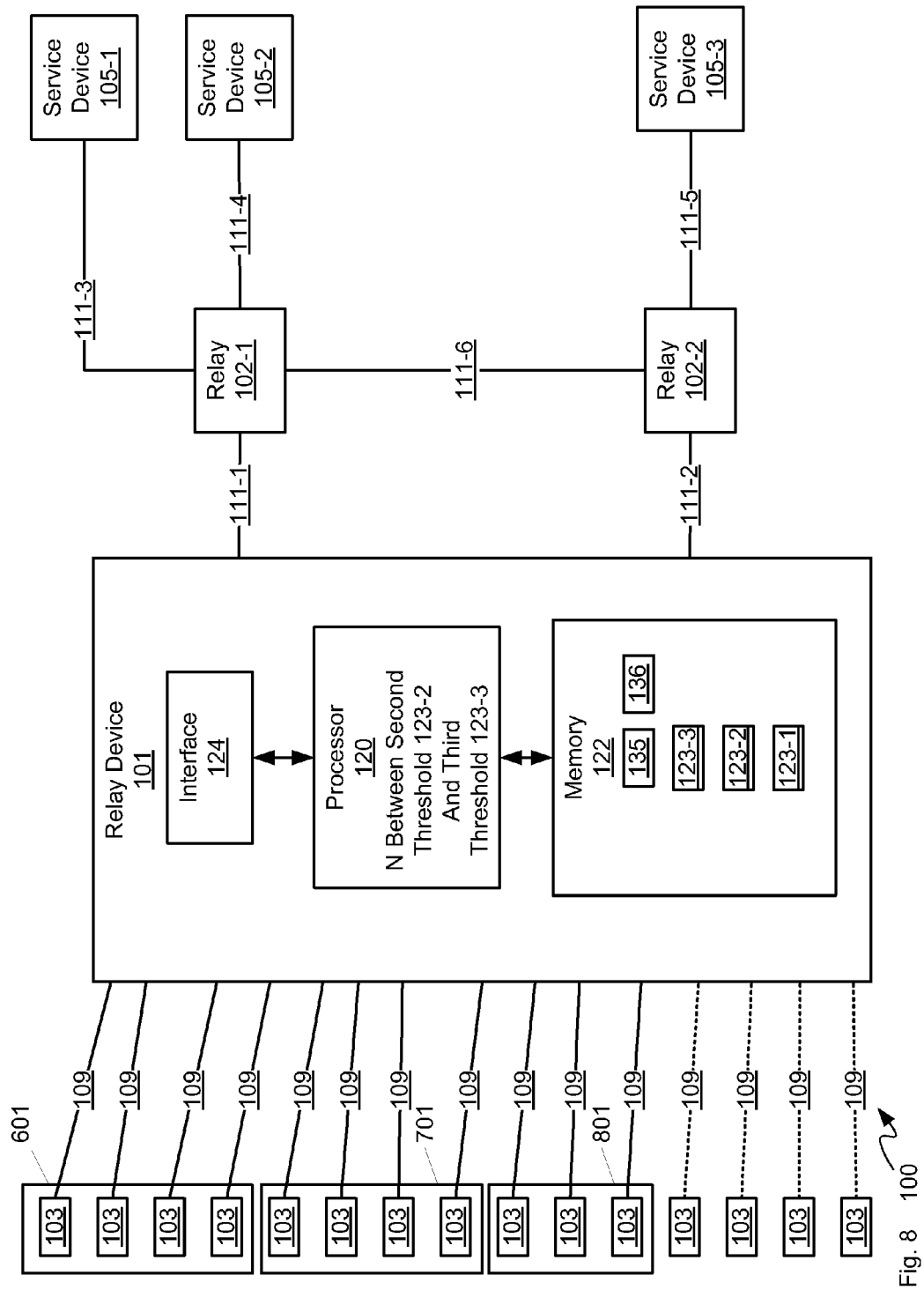
FIG. 8 depicts the system of FIG. 1 when the device of FIG. 2 controls a batch based rate at which communication devices are allowed to communicate with network infrastructure, when a number of messages is between a high threshold and a critical threshold, according to non-limiting implementations.

In FIG. 8, the number of messages, N, has again increased to between second threshold 123-2 and third threshold 123-3; hence the batch size is decreased to three and another batch 801 of three devices 103 is allowed to establish communications with the network infrastructure.

Figure 9:
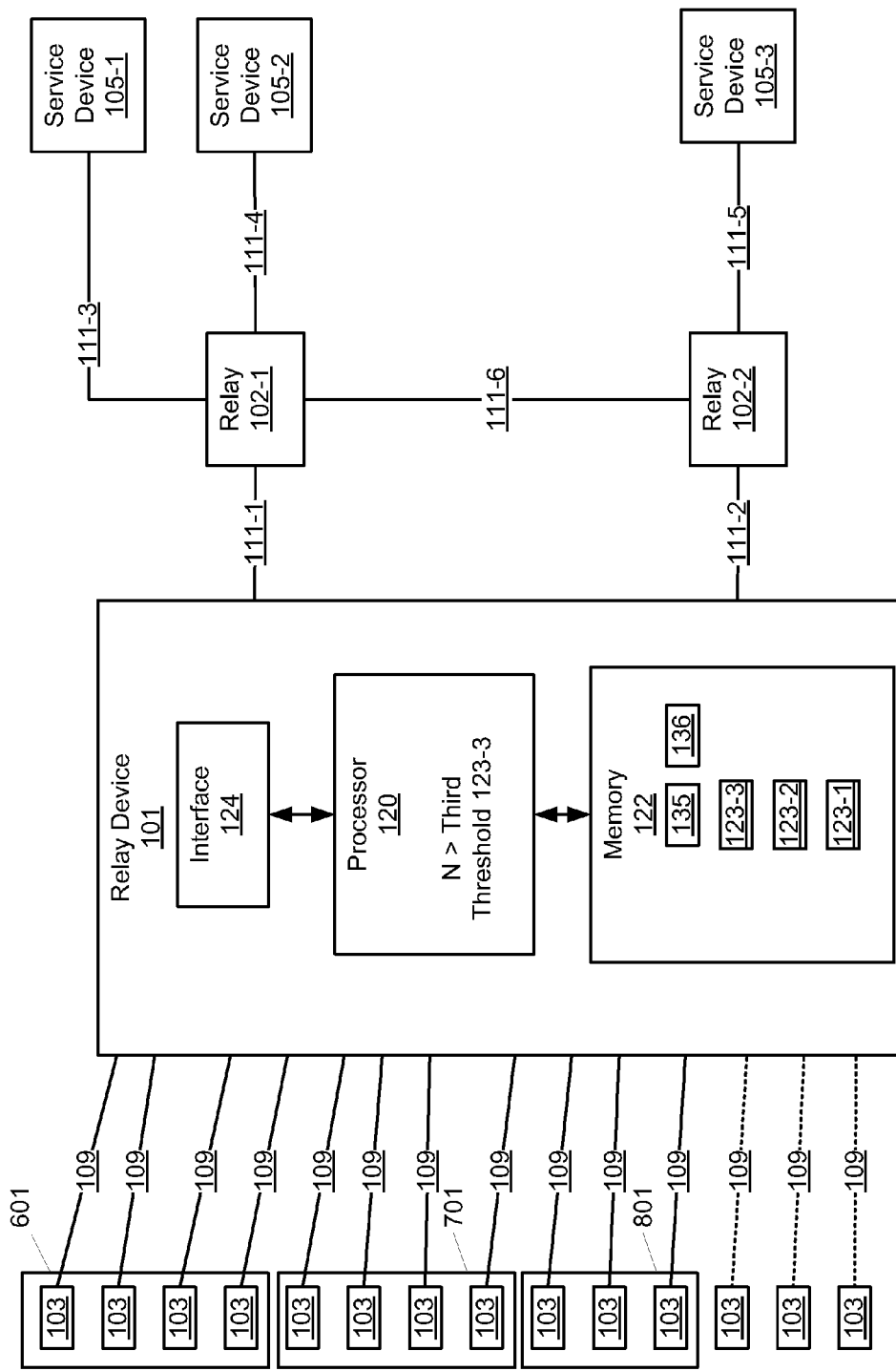
FIG. 9 depicts the system of FIG. 1 when the device of FIG. 2 controls a batch based rate at which communication devices are allowed to communicate with network infrastructure, when a number of messages is above a critical threshold, according to non-limiting implementations.

In FIG. 9, the number of messages, N, has again increased to above third threshold 123-3; hence the batch size is decreased to "0" and no further devices 103 are allowed to establish communications with the network infrastructure until the number of messages, N, decreases to below third threshold 123-3, at which point the batch size is increased to three devices 103, similar to batch 801 described above.

In the previous discussions, it is further assumed that while some devices 103 are being allowed to establish communications with the network infrastructure, some of devices 103 that are initially in communication with the network infrastructure are going out of coverage at rates that can be greater than, less than or about equal to a current rate at which devices 103 are being allowed to establish communications with network infrastructure. It is further appreciated that devices 103 going out of coverage also affect the number of messages N.

Heretofore, the effect of rate when a number of messages exactly equals a given threshold value 123 has not been discussed, however any suitable action can be taken in such implementations relative to a given threshold 123. For example, in some implementations, when a number of messages is equal to first threshold 123-1, the rate can be either increased or maintained; similarly, when a number of messages is equal to second threshold 123-2, the rate can be either maintained or decreased; and when a number of messages is equal to third threshold 123-2, the rate can be either decreased or set to zero. Indeed, the action taken when the number of messages is equal to a given threshold 123 is largely irrelevant and can be set in application 135 as desired.

Persons skilled in the art will appreciate that there are yet more alternative implementations and modifications possible. For example, the rate can also be controlled by changing one or more of periodicity and a length of time being allowing batches of devices 103 to communicate with network infrastructure.

Further, while the rate can be changed via thresholds, in other implementations memory 122 can store a function, R=F(N), where R is the rate, N is the number of messages and F is an inverse function where rate decreases as N increases and vice versa. Processor 120 can hence control the rate, R, based on function F(N).

Further, the changes in batch size can be fixed or dynamic: for example, when the number of messages N is increasing at a respective rate that is, for example, above a message threshold when the batch size is decreased (i.e. decreasing batch size did not lead to a decrease in a number of messages), a next decrease in batch size can be larger than a previous decrease in batch size. Alternatively, periodicity of checking the number of messages N can be fixed or dynamic: for example, when the number of messages N is increasing at a respective rate that is, for example, above the message threshold, regardless the batch size being decreased, the periodicity of allowing batches to communicate with network infrastructure can be decreased.

Figure 10:
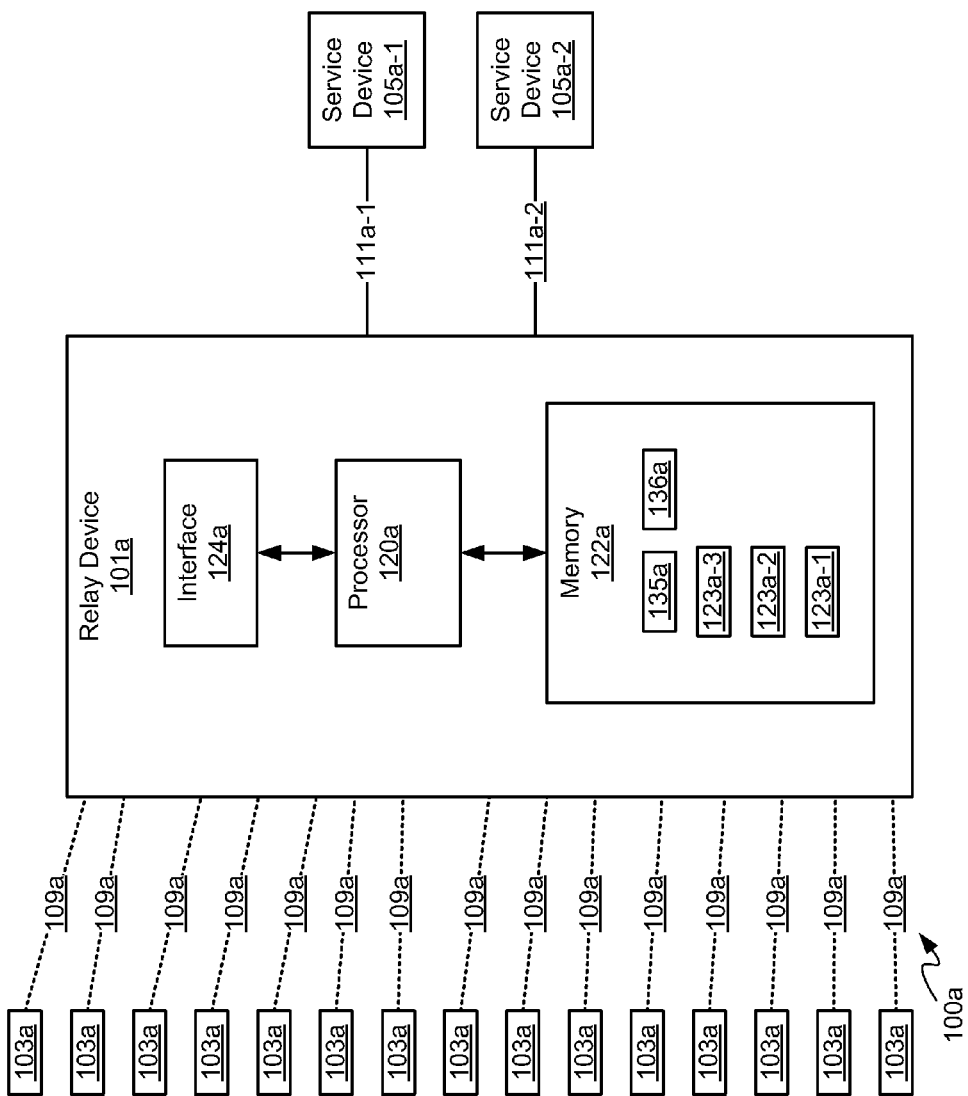
FIG. 10 depicts an alternative system for managing load in a communication network, according to non-limiting implementations.

Persons skilled in the art will appreciate that there are yet more alternative implementations and modifications possible. For example attention is next directed to FIG. 10, which depicts a system 100a that is substantially similar to system 100 of FIG. 1, with like elements having like numbers, but an "a" appended thereto. System 100a hence comprises a relay device 101a, a plurality of communication devices 103a, and service devices 105a-1, 105a-2 according to non-limiting implementations. Relay device 101a can establish communications with each communication device 103a via a respective link 109a. Relay device 101 is in communication with service devices 105a-1, 105a-2 via respective links 111a-1, 111a-2. Relay device 101a further comprises a processor 120a interconnected with a memory 122a and a communication interface 124a. Memory 122a further stores a plurality of threshold values 123a-1, 123a-2, 123a-3 and an application 135a, similar to application 135. Like memory 122, memory 122a can also store given time period data 136a indicative of a time period during which a history of a number of messages previously relayed by relay device 101a is established. While not depicted relay device 101a can further comprise connection objects, a relay manager and a routing table, as described above. In any event, system 100a is similar to system 100 but without other relays intervening between relay device 101a and service devices 105. Otherwise methods 300, 500 can be implemented at relay device 101a to control a rate at which communication devices 103a access network infrastructure, including but not limited to service devices 105a-1, 105a-2, wherein there is an inverse relationship between the rate and the number of messages that are one or more of currently queued for relay via the communication interface 124a and previously relayed within a given time period indicated by given time period data 136a.

In any event, by generally controlling a rate at which the plurality of devices 103 establishes communications with the network infrastructure according to an inverse relationship between the rate and the number of messages one or more of currently queued for relay via interface 124 and previously relayed within a given time period, load within system 100 can be controlled so as to decrease a risk of device 101 being overloaded with messages and/or data associated with devices 103. Further, the risk of reaching bandwidth capacity in links 109 is decreased.

Those skilled in the art will appreciate that in some implementations, the functionality of device 101 can be implemented using pre-programmed hardware or firmware elements (e.g., application specific integrated circuits (ASICs), electrically erasable programmable read-only memories (EEPROMs), etc.), or other related components. In other implementations, the functionality of device 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever Persons skilled in the art will appreciate that there are yet more alternative implementations and modifications possible, and that the above examples are only illustrations of one or more implementations. The scope, therefore, is only to be limited by the claims appended hereto.

What is claimed is:

1. A relay device comprising:
   a communication interface, a memory storing a first threshold value, a second threshold value and a third threshold value, and a processor for relaying messages, via the communication interface, between a plurality of devices and a network infrastructure, the processor configured to:
   determine a number of the messages one or more of currently queued for relay via the communication interface and previously relayed within a given time period; and,
   control a rate at which the plurality of devices establish communications with the network infrastructure by blocking access between given devices of the plurality of devices and the network infrastructure by refusing to receive inbound data from the given devices and queuing outbound data for the given devices received from the network infrastructure in a respective message queue, wherein there is an inverse relationship between the rate and the number of messages;

increase the rate when the number of messages is below the first threshold value;

maintain a current rate when the number of message is between the first threshold value and the second threshold value;

decrease the rate when the number of message is between the second threshold value and the third threshold value; and, set the rate zero when the number of message is above the third threshold value.

2. The relay device of claim 1, wherein the network infrastructure comprises one or more of other relay devices and service devices providing services to the plurality of devices.

3. The relay device of claim 1, wherein the processor is further configured to:

allow the plurality of devices to establish communications with the network infrastructure in batches;

increase the rate by increasing a size of the batches; and decrease the rate by decreasing the size of the batches.

4. The relay device of claim 1, wherein the processor is further configured to control the rate by allowing the plurality of devices to establish communications with the network infrastructure in batches, wherein the inverse relationship is between a size of the batches and the number of messages.

5. The relay device of claim 1, further comprising a memory storing a plurality of threshold values, wherein the processor is further configured to inversely change the rate as the number of messages rises above each successive threshold value of the plurality of threshold values.

6. The relay device of claim 1, further comprising a memory storing a threshold value, wherein the processor is further configured to increase the rate when the number of messages is below the threshold value and maintain a current rate when the number of message is above the threshold value.

7. The relay device of claim 1, further comprising a memory storing a threshold value, wherein the processor is further configured to maintain a current rate when the number of messages is below the threshold value and decrease the rate when the number of messages is above the threshold value.

8. The relay device of claim 1, further comprising a memory storing a threshold value, wherein the processor is further configured to decrease the rate when the number of messages is below the threshold value and set the rate zero when the number of message is above the threshold value.

9. The relay device of claim 1, further comprising a front end component of the network infrastructure.

10. A method comprising:

determining, at a processor of a relay device, a number of messages one or more of currently queued for relay via a communication interface of the relay device and previously relayed within a given time period, the communication interface and the processor of the relay device for relaying the messages, via the communication interface, between a plurality of devices and a network infrastructure;

controlling, at the processor, a rate at which the plurality of devices establish communications with the network infrastructure by blocking access between given devices of the plurality of devices and the network infrastructure by refusing to receive inbound data from the given devices and queuing outbound data for the given devices received from the network infrastructure in a respective message queue, wherein there is an inverse relationship between the rate and the number of messages;

increasing the rate when the number of messages is below a first threshold value, the relay device further comprising a memory storing the first threshold value, a second threshold value and a third threshold value;

maintaining a current rate when the number of messages is between the first threshold value and the second threshold value;

decreasing the rate when the number of messages is between the second threshold value and the third threshold value; and, setting the rate zero when the number of messages is above the third threshold value.

11. The method of claim 10, wherein the network infrastructure comprises one or more of other relay devices and service devices providing services to the plurality of devices.

12. The method of claim 10, further comprising:

allowing the plurality of devices to establish communications with the network infrastructure in batches;

increasing the rate by increasing a size of the batches; and decreasing the rate by decreasing the size of the batches.

13. The method of claim 10, further comprising controlling the rate by allowing the plurality of devices to establish communications with the network infrastructure in batches, wherein the inverse relationship is between a size of the batches and the number of messages.

14. The method of claim 10, wherein the relay device further comprises a memory storing a plurality of threshold values, and wherein the method further comprises inversely changing the rate as the number of messages rises above each successive threshold value of the plurality of threshold values.

15. The method of claim 10, wherein the relay device further comprises a memory storing a threshold value, and wherein the method further comprises increasing the rate when the number of messages is below the threshold value and maintaining a current rate when the number of message is above the threshold value.

16. The method of claim 10, wherein the relay device further comprises a memory storing a threshold value, and wherein the method further comprises maintaining a current rate when the number of messages is below the threshold value and decreasing the rate when the number of messages is above the threshold value.

17. The method of claim 10, wherein the relay device further comprises a memory storing a threshold value, and wherein the method further comprises decreasing the rate when the number of messages is below the threshold value and setting the rate zero when the number of message is above the threshold value.

18. A computer program product, comprising a non-transitory computer usable medium having a computer readable program code adapted to be executed to implement a method comprising:

determining, at a processor of a relay device, a number of messages one or more of currently queued for relay via a communication interface of the relay device and previously relayed within a given time period, the communication interface and the processor of the relay device for relaying the messages, via the communication interface, between a plurality of devices and a network infrastructure;

controlling, at the processor, a rate at which the plurality of devices establish communications with the network infrastructure by blocking access between given devices of the plurality of devices and the network infrastructure by refusing to receive inbound data from the given devices and queuing outbound data for the given devices received from the network infrastructure in a respective message queue, wherein there is an inverse relationship between the rate and the number of messages;

increasing the rate when the number of messages is below a first threshold value, the relay device further comprising a memory storing the first threshold value, a second threshold value and a third threshold value;

maintaining a current rate when the number of messages is between the first threshold value and the second threshold value;

decreasing the rate when the number of messages is between the second threshold value and the third threshold value; and, setting the rate zero when the number of messages is above the third threshold value.

\* \* \* \* \*